(12) United States Patent
Chan et al.

(10) Patent No.: US 7,167,878 B2
(45) Date of Patent: Jan. 23, 2007

(54) SYSTEM AND METHOD FOR IDENTIFYING AND MAINTAINING BASE TABLE DATA BLOCKS REQUIRING DEFERRED INCREMENTAL INTEGRITY MAINTENANCE

(75) Inventors: Petrus K. C. Chan, Richmond Hill (CA); Timothy R. Malkemus, Round Rock, TX (US); Sriram K. Padmanabhan, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 10/423,407

(22) Filed: Apr. 25, 2003

(65) Prior Publication Data
US 2004/0122868 A1 Jun. 24, 2004

(30) Foreign Application Priority Data
Dec. 23, 2002 (CA) .................. 2414980

(51) Int. Cl.
*G06F 12/00* (2006.01)
*G06F 17/30* (2006.01)

(52) U.S. Cl. ...................... 707/204; 707/200
(58) Field of Classification Search ......... 707/1–104.1, 707/200, 204
See application file for complete search history.

(56) References Cited

U.S. PATENT DOCUMENTS

| | | | | |
|---|---|---|---|---|
| 4,243,984 A | * | 1/1981 | Ackley et al. ................. 345/22 |
| 4,961,134 A | * | 10/1990 | Crus et al. ..................... 707/8 |
| 5,043,871 A | * | 8/1991 | Nishigaki et al. ........... 707/202 |
| 5,982,572 A | * | 11/1999 | Dahlerud ................... 360/72.2 |
| 5,991,754 A | | 11/1999 | Raitto et al. ................... 707/2 |
| 6,009,201 A | * | 12/1999 | Acharya ..................... 382/232 |
| 6,345,272 B1 | | 2/2002 | Witkowski et al. ............ 707/4 |
| 6,438,562 B1 | * | 8/2002 | Gupta et al. ................ 707/201 |
| 6,591,272 B1 | * | 7/2003 | Williams .................... 707/102 |
| 6,618,719 B1 | * | 9/2003 | Andrei ......................... 707/2 |
| 6,622,168 B1 | * | 9/2003 | Datta .......................... 709/219 |
| 2002/0010706 A1 | | 1/2002 | Brickell et al. ............. 707/200 |
| 2002/0116457 A1 | * | 8/2002 | Eshleman et al. .......... 709/203 |

OTHER PUBLICATIONS

Lehner et al., "Fast refresh using mass query optimization", IEEE, 2001, pp. 391398.*
Holst et al., "Incremental table-based method dispatch for reflective object-oriented languages", Aug. 1997, pp. 1-12.*

* cited by examiner

*Primary Examiner*—Don Wong
*Assistant Examiner*—Linh Black
(74) *Attorney, Agent, or Firm*—Samuel A. Kassatly

(57) ABSTRACT

A block map is associated with a multi-dimensionally clustered (MDC) base table in a database to maintain a "free" or "in use" status for each of the contiguous blocks in the table. Additionally, information may be stored in the block map to indicate whether, after loading data, a given block in the base table requires constraint checking operation or whether, based on changes to the block, a materialized query table dependent upon the table requires a refresh operation. Each time data is loaded into the table, the associated block map is updated. When delayed constraint check or refresh operations are to be performed, the block map is consulted to learn which blocks require the operations. After one of the constraint check or refresh operations is performed, the associated block map is again updated. The block map enables a method to efficiently identify data blocks in a base table, changes to which trigger incremental constraint checking operations and incremental maintenance operations of dependent materialized query tables.

22 Claims, 11 Drawing Sheets

SYSTEM AND METHOD FOR IDENTIFYING AND MAINTAINING BASE TABLE DATA BLOCKS REQUIRING DEFERRED INCREMENTAL INTEGRITY MAINTENANCE

PRIORITY CLAIM

The present application claims the priority of Canadian patent application, Serial No. 2,414,980, titled "Deferred Incremental Integrity Maintenance of Base Tables Having Contiguous Data Blocks," which was filed on Dec. 23, 2002, and which is incorporated herein by reference.

FIELD OF THE INVENTION

The present invention relates to database integrity maintenance and, in particular, to deferred incremental integrity maintenance of base tables within a database that has contiguous data blocks.

BACKGROUND OF THE INVENTION

A database management system (DBMS) is a computer program that allows one or more computer users to create and access data in a database. A user accessing data in a database typically composes a request in the form of a "query". The result of a query is often a "table". The term "table" is used herein generically, and is not meant to distinguish the DBMS discussed herein from DBMSs that use similar terms, such as "file" or "relation".

The DBMS manages user requests (and requests from programs) so that the users and the programs need not maintain information about where the data is physically located on storage media and, in a multi-user system, other users also accessing the data. In handling user requests, the DBMS ensures the integrity of the data (i.e., ensuring that the data continues to be accessible and is consistently organized as intended) and the security of the data (i.e., ensuring that only those with access privileges can access the data). The most typical DBMS is a relational database management system (RDBMS). A standard user and program interface is the Structured Query Language (SQL).

Constraints (both referential integrity and check constraints) are conditions defined for a given table that must be true for all rows of the table. The DBMS enforces a constraint by checking each row to determine whether the row meets conditions specified by a given constraint, rejecting any rows that do not meet the conditions. This checking may be deferred until later, after appending data to a given table using a "load" operation (use of which allows the addition of data to a table). When such constraint checking is deferred until later, the given table may be placed in "check pending" state. Once the checking is complete, violating rows may be removed from the given table and the given table may be placed in "normal" state.

A materialized query table (MQT) is a table defined as the result of a query, that result being automatically used to populate the MQT, which can then be used to efficiently provide a pre-computed result, or a partially pre-computed result, for certain other queries submitted to the DBMS. An MQT that references a given base table in the query that defines the MQT (the defining query of the MQT) is said to be a "dependent" of the given base table. An MQT could reference one or more such base tables and would be said to be a dependent of each of the base tables. Additionally, a given base table could be referenced in more than one MQT and each of those MQTs would be a dependent of that given base table. When new data is added to a base table that has dependent MQTs, each of the MQTs should, in general, be updated (refreshed) to reflect a new result for the corresponding defining query.

Dependent MQTs may be refreshed immediately or the refresh may be deferred until later. When an MQT is defined as REFRESH IMMEDIATE, whenever its content is available, it should be up to date. However, after a load operation into the base table, the dependant MQTs are placed in "check pending" state and become unavailable. When an MQT is refreshed, i.e., all new data in base tables for which the MQT is a dependent is reflected in the MQT, the MQT may be placed in "normal" state. When an MQT is defined as REFRESH DEFERRED, its content reflects the result of the MQT definition query when the MQT was last refreshed and hence its content may not always be up to date with respect to its base tables.

New data can be added to base tables periodically, often through the use of a load utility. In some cases, old data is removed from base tables when the old data is no longer needed or is obsolete. When old data is removed from base tables, gaps may be left in the physical space used to store the data. Where the base table is not a multi-dimensionally clustered (MDC) table, i.e., a base table of contiguous blocks of equal-size pages, the gaps left in the physical space used to store the data are not easily usable by the load utility, because the load utility is typically optimized for speed by being configured to append new data to the end of a base table.

Since the new data is added only at the end of the base table, the base table may be checked against constraints and dependant MQTs may be incrementally refreshed. Both operations, constraint checking the rows of the base table and refreshing the dependant MQTs, are considered to be straightforward in that the operations simply require a scan of the new data in the base table to identify the changes to the base table. Such a scan starts at the previously recorded "high water mark" of the base table and, thus, considers all of the new data and none of the old data.

An MDC table comprises contiguous blocks of equal-size pages. Each block of a given MDC table is the same size. The size of a block, in pages, is termed the block size. All rows stored in a given block have the same number of specified columns. This number of specified columns for the rows of a given block is termed the "dimension" value for the rows. The DBMS manages the data in the database to maintain this trait of each block. That is, new rows may only be added to existing blocks whose rows have the same dimension values as the new rows. Additionally, empty blocks may be reused for new rows or new blocks may be allocated at the end of the MDC table. The load utility program will not use existing populated blocks for new rows but will, instead, reuse empty blocks in the MDC table or extend the MDC table if no reusable blocks exist.

An MDC table is designed such that as old blocks of data are removed from the MDC table, the space the old data occupied is available for the later addition of new data. Consequently, simply scanning the MDC table from a certain point onward will lead to the consideration of old data as well as new data. This consideration of old data may lead to incorrect results when refreshing a dependant MQT (i.e., data may be counted twice) and inefficiency when performing constraint checking on the rows of the MDC table. Since the old data has already been checked and is known to be correct, it is inefficient to check the old data again.

Clearly, there is a need for an efficient method of performing incremental constraint checking on MDC tables that takes into account the nature of MDC tables wherein new data is interspersed with old data. Additionally, maintenance of MQTs dependant on MDC tables is not as straightforward as maintenance of MQTs dependant on non-MDC tables. Consequently, there is a need for a method of maintaining MQTs dependant on MDC tables that does not lead to incorrect results when refreshing the MQTs. The need for such a system has heretofore remained unsatisfied.

SUMMARY OF THE INVENTION

The present invention satisfies this need, and presents a system, a computer program product, and an associated method (collectively referred to herein as "the system" or "the present system") for identifying and maintaining base table data blocks requiring deferred incremental integrity maintenance.

An incremental maintenance operation processes only new data during a maintenance operation, where exemplary maintenance operations comprise constraint checking operations and MQT refresh operations. To perform incremental maintenance operations more efficiently, use is made of a block map. A block map, in this context, is introduced as a structure associated with MDC tables for recording the status of each block of pages in the MDC table.

The status of each block may be recorded as either "free", i.e., empty and reusable for new data, or "in use", i.e., containing one or more rows of data. In aspects of the present system, additional status information per block is stored in the block map. The additional status information may comprise: 1) whether changes to the block require a constraint checking operation to be performed on the block; and 2) whether changes to the block require a refresh operation to be performed on an MQT dependent upon the MDC table. These two items are recorded separately, in case the MDC table is checked for constraints and further new data is added before the MQT refresh operation is performed.

In accordance with an aspect of the present system there is provided a method of efficiently identifying data blocks that require an incremental maintenance operation to be performed on a database, the database having at least one base table having a plurality of contiguous data blocks. The method comprises searching a block map associated with the base table to identify one or more marked data blocks, where a marked data block indicates that the maintenance operation is required. Additionally, there is provided a computer readable medium for allowing a general purpose computer to perform this method.

In accordance with an aspect of the present system there is provided a method of using data blocks in a database including a base table having a plurality of contiguous data blocks. The method comprises associating a block map with the base table indicating, for each data block in the plurality of contiguous data blocks, whether a maintenance operation on the database is required. Additionally, there is provided a computer readable medium for allowing a general purpose computer to perform this method.

In accordance with an aspect of the present system there is provided a method of loading data into a table in a database management system, where the table comprises a plurality of contiguous blocks. The method comprises associating a block map with the table, where a status of each of the plurality of contiguous blocks is recorded in the block map; loading data into the table; and modifying the block map to reflect a change in status of some of the plurality of contiguous blocks due to the loading the data into the table. Additionally, there is provided a computer readable medium for allowing a general purpose computer to perform this method.

In accordance with an aspect of the present system there is provided a database system. The data base system comprises a memory adapted to store: a database including a base table having a plurality of contiguous data blocks; and a block map, associated with the base table, adapted to indicate, for each data block in the plurality of contiguous data blocks, whether a maintenance operation on the database is required.

In accordance with another aspect of the present system there is provided a data processing system for efficiently identifying data blocks that require an incremental maintenance operation to be performed on a database, the database having at least one base table having a plurality of contiguous data blocks. This data processing system includes means for searching a block map associated with the base table to identify one or more marked data blocks, where a marked data block indicates that the maintenance operation is required.

In accordance with yet another aspect of the present system there is provided a data processing system for performing an incremental maintenance operation on a database, the database having at least one base table having a plurality of contiguous data blocks. This data processing system includes means for efficiently identifying data blocks that require an incremental maintenance operation to be performed on the database, the database having at least one base table having a plurality of contiguous data blocks. In addition, the data processing system includes means for searching a block map associated with the base table to identify one or more marked data blocks, where a marked data block indicates that the maintenance operation is required, and means for performing the incremental maintenance operation on the database.

In accordance with yet another aspect of the present system there is provided a data processing system of using data blocks in a database including a base table having a plurality of contiguous data blocks, including means for associating a block map with the base table indicating, for each data block in the plurality of contiguous data blocks, whether a maintenance operation on the database is required.

In accordance with yet another aspect of the present system there is provided a data processing system of loading data into a table in a database management system, where the table comprises a plurality of contiguous blocks, the data processing system including: means for associating a block map with the table, where a status of each of the plurality of contiguous blocks is recorded in the block map, means for loading data into the table, and means for modifying the block map to reflect a change in status of some of the plurality of contiguous blocks due to the loading the data into the table.

In accordance with yet another aspect of the present system there is provided a computer readable medium containing computer-executable instructions for configuring the data processing system as described above.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

An MDC table comprises contiguous blocks of equal-size pages. Each block of a given MDC table is the same size. The size of a block, in pages, is termed the block size. All rows stored in a given block have the same number of specified columns. This number of specified columns for the rows of a given block is termed the "dimension" value for the rows.

The DBMS manages the data in the database to maintain this trait of each block. That is, new rows may only be added to existing blocks whose rows have the same dimension values as the new rows. Additionally, empty blocks may be reused for new rows or new blocks may be allocated at the end of the MDC table. The load utility program will not use existing populated blocks for new rows but will, instead, reuse empty blocks in the MDC table or extend the MDC table if no reusable blocks exist.

Figure 11:
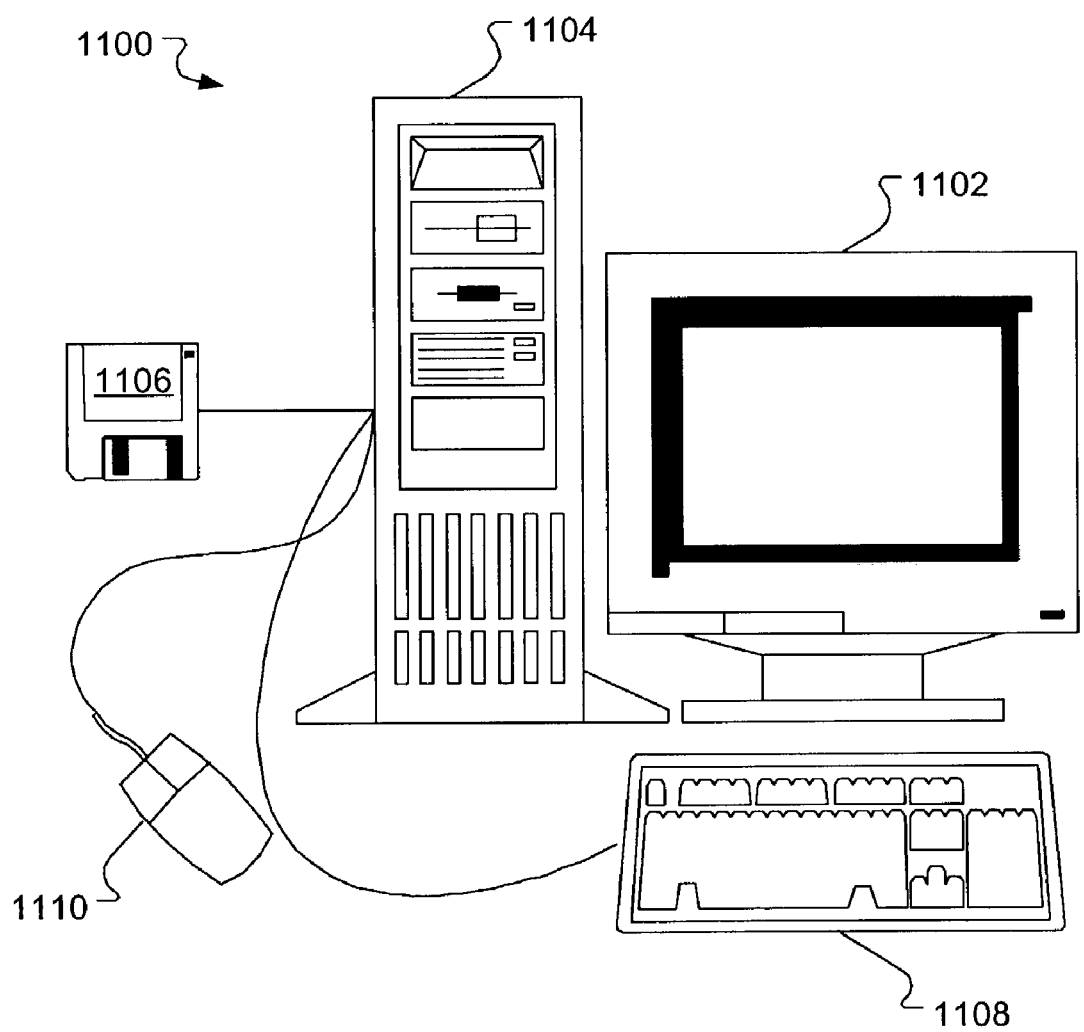
FIG. 11 is a schematic illustration of an exemplary operating environment in which a deferred incremental integrity maintenance of base tables having contiguous data blocks system of the present invention can be used.

A database system 1100, capable of running a database management system according to methods exemplary of the present invention, is illustrated in FIG. 11. The database system 1100 comprises a display monitor 1102 and a central processing unit 1104. The central processing unit 1104 may comprise hardware to network with other computers, long term and short term memory and a processor. As is typical, connected to the central processing unit 1104 may be multiple input peripherals such as a keyboard 1108 and a mouse 1110.

The database system 1100 comprises a software programming code or computer program product that may be loaded with a database management system for executing methods exemplary of this invention from a software medium 1106 which could be a disk, a tape, a chip or a random access memory containing a file downloaded from a remote source. Alternatively, the database system 1100 can be saved on a suitable storage medium such as a diskette, a CD, a hard drive, or like devices.

Briefly, a block map is used to process only new data during constraint checking and MQT refresh operations. A block map is defined herein as a structure that is associated with MDC tables for recording the status of each block of pages in the MDC table. The status of each block may be recorded as either "free", i.e., empty and reusable for new data, or "in use", i.e., containing one or more rows of data. In aspects of the present invention, additional status information per block may be stored in the block map. The additional status information may comprise 1) whether the block requires constraint checking (labeled "C" for check) and 2) whether the block requires MQT maintenance (labeled "R" for refresh). These two items may be recorded separately, in case the MDC table is checked for constraints and further new data is added before an MQT refresh is done. Thus, some blocks may have both R and C flags set and some blocks may have just the R flag set, since the latter blocks have had constraints checked, but have not yet been processed for an MQT refresh.

Each block in a MDC table is identified by a number called the "block ID" or "BID". The BIDs are sequential, starting from zero. MDC tables are extended when necessary (i.e., when there are no reusable, empty blocks in the MDC table) by adding a new block to the end of the MDC table. A new block is given the next sequential BID, one higher in number than the previously highest BID in the MDC table.

For each MDC table, a StartBID and a LastLoadBID is recorded. The StartBID is the BID of the first block reused in any previous load operation, i.e., a load operation that has occurred since the MDC table was most recently in "normal" state. Thus, the StartBID is the lowest value BID of the blocks used in load operations since the MDC table was most recently in "normal" state. The StartBID is zero for a MDC table in "normal" state. The LastLoadBID is the last BID (highest value BID) used in the most recent load operation. The LastLoadBID is normally zero for a MDC table in "normal" state full access mode.

For each MQT, a list of StartBIDs is recorded, with one StartBID recorded for each partition of each MDC table of which an MQT is a dependent.

In the descriptions of a method for loading new data into an existing MDC table, a method for checking constraints of an existing MDC table and a method for refreshing an MQT, which follow, the following notation is used:

UT—an example MDC table that has dependent MQTs and constraints;

MQT—example MQT that is a dependent of MDC table UT;

UT.StartBID—the StartBID stored for MDC table UT;

UT.LastLoadBID—the LastLoadBID stored for MDC table UT; and

MQT.UT.StartBID—the StartBID recorded for the MQT regarding the MDC table UT.

If there is more than one MQT dependent on the example MDC table UT, each MQT will have a distinct StartBID recorded for UT because some of the dependent MQTs may have been refreshed (and, hence, had their StartBID reset to zero), while others may still be awaiting a refresh operation. If a given MQT is dependent on more than one MDC table, the StartBID for each MDC table is recorded separately in a list associated with the given MQT.

A method for loading new data into existing MDC table UT while deferring constraint checking and MQT refresh begins with a search for a free block in the block map. Such a search requires a preliminary determination of the value of UT.LastLoadBID. If UT.LastLoadBID is not zero, the block map of UT is searched starting at the block with a BID of UT.LastLoadBID+1. If UT.LastLoadBID is zero, the block map of UT is searched starting at the beginning. It is assumed that the searching leads to the identification of a first free block. Once the free block is identified, the value of UT.StartBID is considered. If UT.StartBID is zero, then UT.StartBID is set to the BID of the first free block identified in the search. Otherwise, UT.StartBID is left unchanged because another load operation has previously occurred that set the value of UT.StartBID to the BID of the first free block determined for that load operation. It will be appreciated that, after a constraint check, the StartBID of the current load operation can never be lower that the StartBID for an earlier load operation until the StartBID for UT is reset. This is for the reason that the first free block existing for the current load operation cannot be lower than the first free block existing for the earlier load operation. The free blocks identified in the search are then used to store the new data. The block map entry for each block used for storage of the new data is set to U (in use), C (needs constraint checking) and R (needs MQT refresh). Finally, UT.LastLoadBID is set to the highest BID used to store the new data and UT may be placed in "check pending" state.

A method for checking constraints of MDC table UT begins with the block map of UT being scanned, starting with the entry having a BID equal to UT.StartBID. There is no need to scan blocks with BIDs less than UT.StartBID, because those blocks have not been altered since the last constraint check. The goal of the scanning is to locate those entries marked C. Each block corresponding to an entry marked C is scanned and each row in the block is checked for violations of the constraints of UT. Violations are handled in the normal way, which is to say that violating rows either cause an error to be returned or are deleted and inserted into an exception table. If there are MQTs dependent on UT, each dependent MQT may be placed in "check pending" state and UT may be placed in "no data movement" state. These states are explained in detail hereinafter. After constraint checking, UT.StartBID is reset to zero and the C marks on all blocks for the table can be reset.

A method for refreshing an MQT begins with a scan of the block map of UT, starting with the entry having a BID equal to MQT.UT.StartBID. (MQT.UT.StartBID may be different from UT.StartBID because the latter is reset after the constraint check, whereas MQT.UT.StartBID is only reset when the MQT is refreshed.) The goal of the scan is to locate those entries marked R. An incremental maintenance operation is performed on the MQT with data from the rows in each of the blocks corresponding to entries marked R. The MQT.UT.StartBID is set to zero and the MQT may be placed in "normal" state. If no more MQTs dependant on UT remain to be refreshed, UT may be placed in "normal" state and the R marks in all entries of the block map for UT may be turned off and UT.LastLoadBID may be reset. Otherwise, the R marks and UT.LastLoadBID will be preserved until the last such dependant MQT is refreshed.

Although described above in relation to a one-to-one relationship between UT and MQT, these methods may handle many-to-many UT-MQT relationships. Each refresh of dependent MQTs may be performed independently. Also, the paragraphs above describe a single partition to each base table, whereas the methods also handle multiple partitioning for base tables, as described in the flowchart descriptions below.

The R markers of UT may be shared, or reused, by the refresh of all dependent MQTs. The prevention of loading into free blocks before the LastLoadBID prevents a load operation from loading into free blocks having a numerical position before the LastLoadBID. The use of LastLoadBID guarantees that the refresh of dependent MQTs starting from MQT.UT.StartBID will pick up only blocks that have stored new data.

In the flowcharts of FIGS. 1–10, the following definitions and explanations provide background information pertaining to the technical field of the present invention, and are intended to facilitate the understanding of the present invention without limiting its scope:

MDC table: A multi-dimensionally clustered table (of contiguous blocks of equal-size pages).

BID: A unique ID identifying a block in a partition of a MDC table.

Load append: Existing blocks are retained and new blocks are appended to the MDC table.

Load replace: Existing blocks in the MDC table are removed and replaced by new blocks.

"Check pending" state: A generic state for which access to an MDC table is restricted.

"Check pending read access" state: A state for which read access to an MDC table is allowed, but write access to the MDC table is not allowed. More specifically, read access is allowed for those blocks that have not been altered by a load operation and not allowed for those blocks that have been altered by the load operation.

"Check pending no access" state: A state for which neither read nor write access to an MDC table is allowed.

"Full access" state: A state for which read and write access to an MDC table is allowed.

"No data movement" state: A state for which read access to an MDC table is allowed. Write access to an MDC table is allowed as long as the BIDs in the MDC table are not affected and no access to the materialized query tables is required.

Check pending period: An MDC table enters the "check pending" state as a result of a load operation. A "SET INTEGRITY" statement is used to bring the MDC table to the "check pending" state. The period from when the MDC table enters the "check pending" state to when the MDC table is taken out of such a state is referred to as a check pending period.

Full constraint checking: All rows in all blocks in an MDC table are checked for constraint violations.

Incremental constraint checking: Only rows in blocks newly appended to an MDC table during the current check pending period are checked for constraint violations.

Full refresh: A materialized query table (MQT) is fully refreshed by re-computing the materialized query table definition.

Incremental refresh: A materialized query table is incrementally refreshed by only using the rows in blocks that are "load appended" to the base tables since the last time the materialized query table was refreshed.

T: An MDC base table T. Where multiple base tables may be involved, the ith base table is labeled Ti. The term "base table" is used to distinguish a table on which an MQT depends from materialized query tables.

Ti.partitionk: kth partition of MDC base table Ti.

Ti.partitionk.startBID: BID of the first (i.e., lowest number) block loaded in the first load append operation performed on the kth partition of MDC base table Ti in the current check pending period.

T.partitionk.lastLoadBID: The highest BID of any block in the kth partition of MDC base table T that has been loaded with new data.

Ti.partitionk.loadOpr: The most expensive load operation on partition k of MDC base table Ti during the check pending period.

Ti.blockmapk: Each partition of MDC base table Ti has a blockmap, which is the structure that MDC tables have for recording the status of each block of pages in the MDC table. Ti.blockmapk is the blockmap corresponding to Ti.partitionk.

Ti.blockmapk[h]: The blockmap entry representing the hth block in Ti.partitionk.

Ti.blockmapk[h].Used: The status flag for Ti.blockmapk[h]. The status flag has value TRUE if block h is used and has value FALSE otherwise.

Ti.blockmapk[h].Constraint: The constraint flag for Ti.blockmapk[h]. The constraint flag has value TRUE if block h is to be checked for constraint violations and has value FALSE otherwise.

Ti.blockmapk[h].Refresh: The refresh flag for Ti.blockmapk[h]. The refresh flag has value TRUE if block h is to be used for refresh processing of dependent materialized query tables and has value FALSE otherwise.

Ti.BID_dep_count: The number of MQTs that remain to be incrementally refreshed using the BIDs of this MDC base table. This number is used to determine whether an MDC base table goes into "full access" or "no data movement" state after this MDC base table is brought out of the "check pending" state. When this number drops to zero, the MDC base table can go into normal state "full access" mode.

MQT: Materialized Query Table (where multiple MQTs may be involved, the jth MQT is labeled MQTj).

MQT.force_full: If TRUE, then the materialized query table cannot be incrementally refreshed but, rather, requires a full refresh. A materialized query table will require full refresh if any of the MDC base tables of the materialized query table has had a load replace operation performed.

MQT_PD: The packed descriptor for a materialized query table. A packed descriptor is used to store the starting BIDs of the MDC base tables, where the starting BIDs are subsequently used for incremental refresh of the materialized query table. Where multiple MQTs may be involved, the packed descriptor for the jth materialized query table is labeled MQT PDj.

MQT_PD.Ti.partitionk.startBID: The StartBID in the kth partition of the ith MDC base table on which the MQT depends for an incremental refresh.

Figure 1:
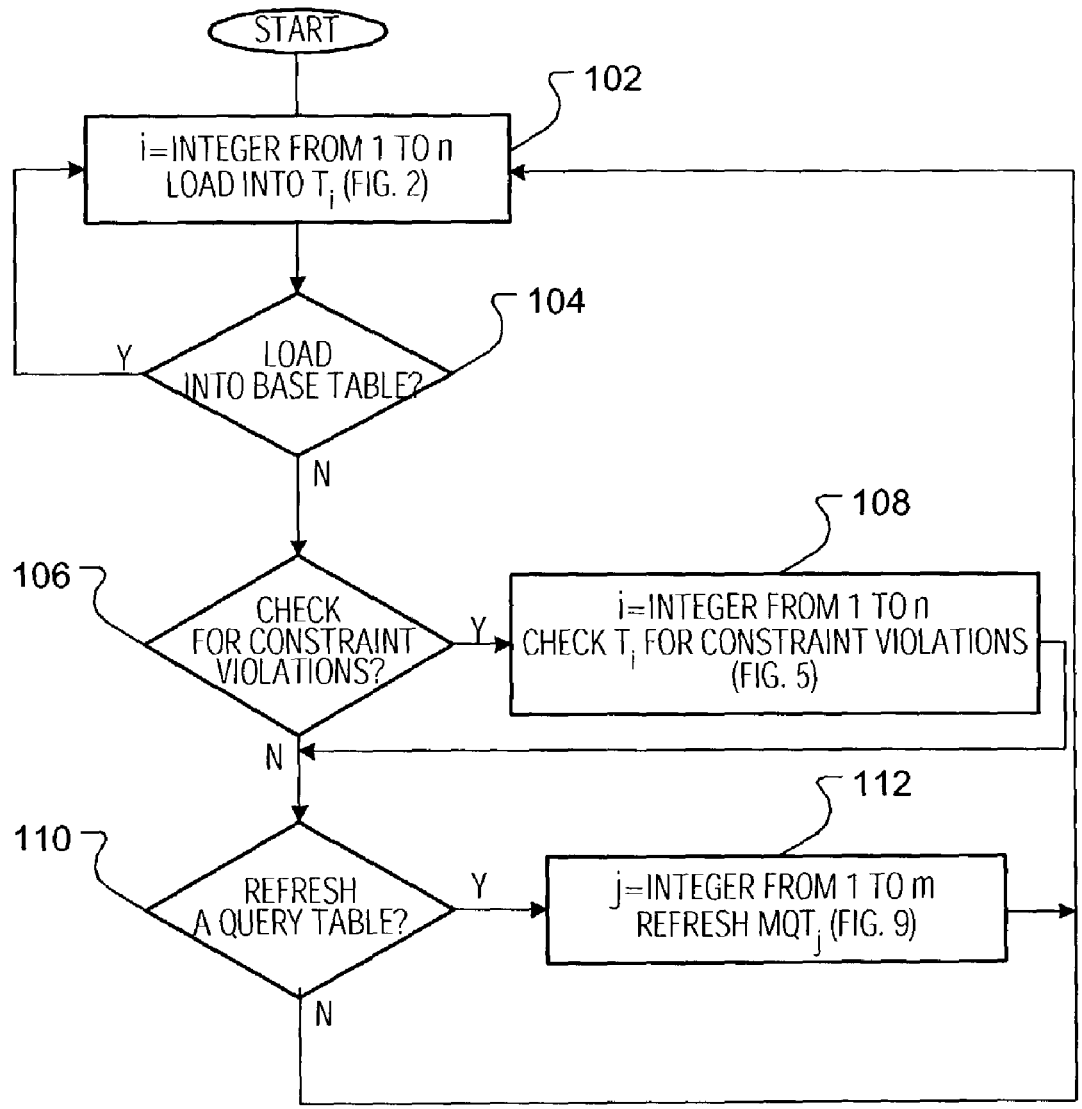
FIG. 1 is a process flow chart illustrating a Load, Constraint Checking, and Materialized Query Table maintenance method employing according to the present invention.

FIG. 1 is a high level overview of an incremental database maintenance method in which aspects of the present invention may be employed. Initially, data may be loaded into a number of MDC base tables, Ti, for i taking the values from 1 to n inclusive (step 102), where n is the number of MDC base tables. Step 102 is expanded upon in FIG. 2.

The user could then perform a further load operation if required (step 104), in which case the load operation of step 102 is repeated. If there are no more load operations to be performed, the loaded MDC base tables may be checked for constraint violations (step 108) or a refresh of materialized query tables that are dependent on the loaded MDC base tables may be performed (step 112). If it is determined (step 106) that a check for constraint violations is necessary, each of the MDC base tables is checked for constraint violations (step 108). Step 108 is further illustrated in more detail in FIG. 5.

Once the MDC base tables have been checked for constraint violations or if it is determined (step 106) that a check for constraint violations is not necessary, it is determined whether a refresh of a materialized query table is necessary (step 110). If it is determined that a refresh of m materialized query tables is necessary, the quantity, m, of materialized query tables are refreshed (step 112). Step 112 is expanded upon in FIG. 9. Once the refresh of the materialized query tables is complete, the load operation of step 102 may be repeated. If it is determined that no materialized query tables need to be refreshed, the load operation of step 102 may be repeated. Loading data into an MDC base table, constraint checking and materialized query tables refreshing can be performed independently of each other and in any order.

Figure 2:
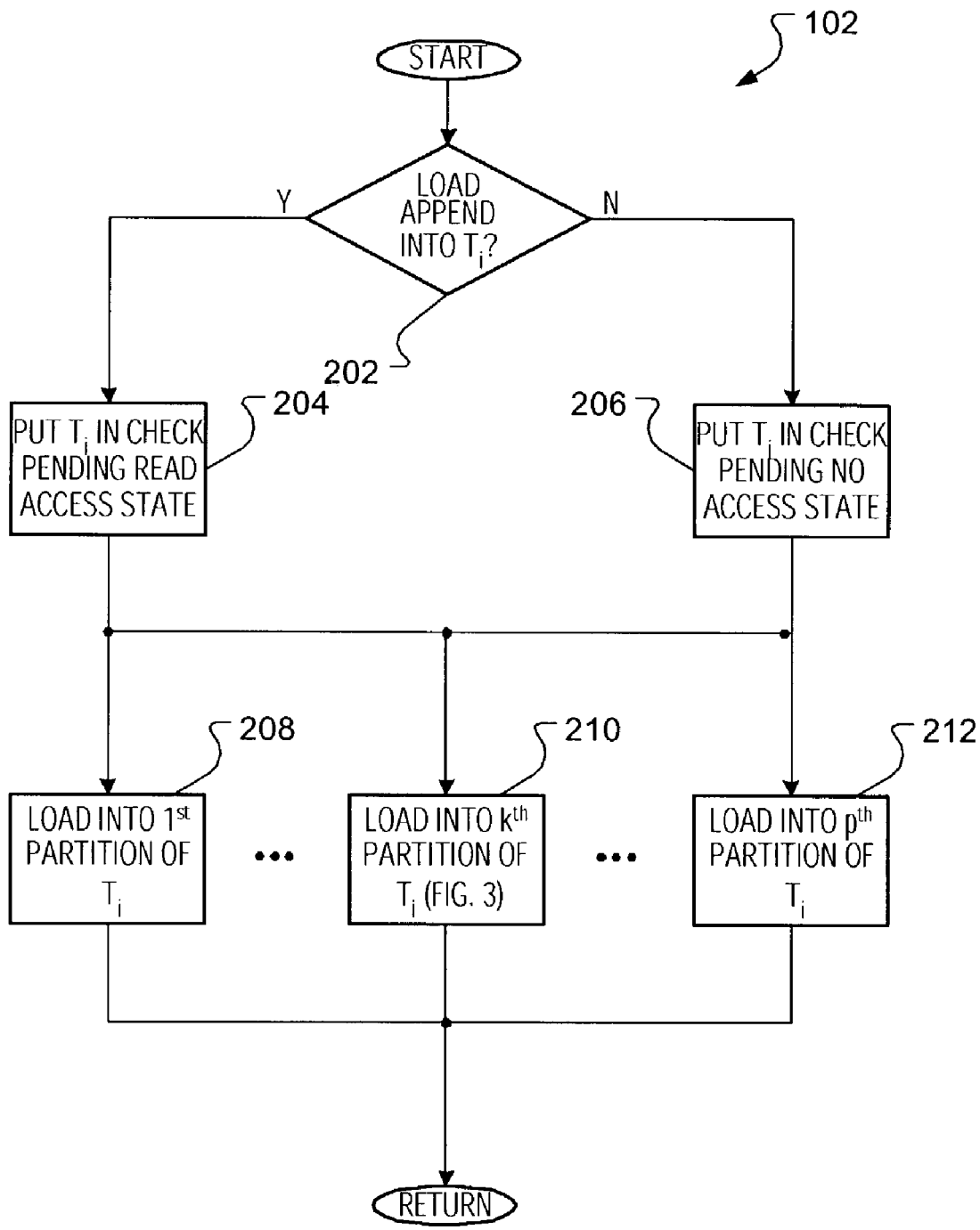
FIG. 2 is a process flow chart illustrating a table loading method used in the Load, Constraint Checking, and Materialized Query Table maintenance method of FIG. 1, according to an embodiment of the present invention.

FIG. 2 expands upon step 102 of FIG. 1 to illustrate that loading into an MDC base table Ti may be translated into loading to the individual partitions on which Ti is defined. The loaded MDC base table is either placed in "check pending read access" state or placed in "check pending no access" state, depending on the type of the load. The type of load is the first determination (step 202).

Where the load operation is a "load append" operation, the MDC base table, Ti, may be placed in "check pending read access" state (step 204). Where the load operation is other than a load append operation, the MDC base table, Ti, may be placed in "check pending no access" state (step 206). After placing the MDC base table in the appropriate state (steps 204, 206), partitions of the MDC base table may be loaded in parallel. In particular, the first partition of the MDC base table may be loaded (step 208) while the last (pth) partition is loaded (step 212) and intermediate (kth) partitions are loaded (step 210). Step 210 is expanded upon in FIG. 3. The load operation is then considered complete and the program control may be returned to the materialized query table maintenance method of FIG. 1.

Figure 3:
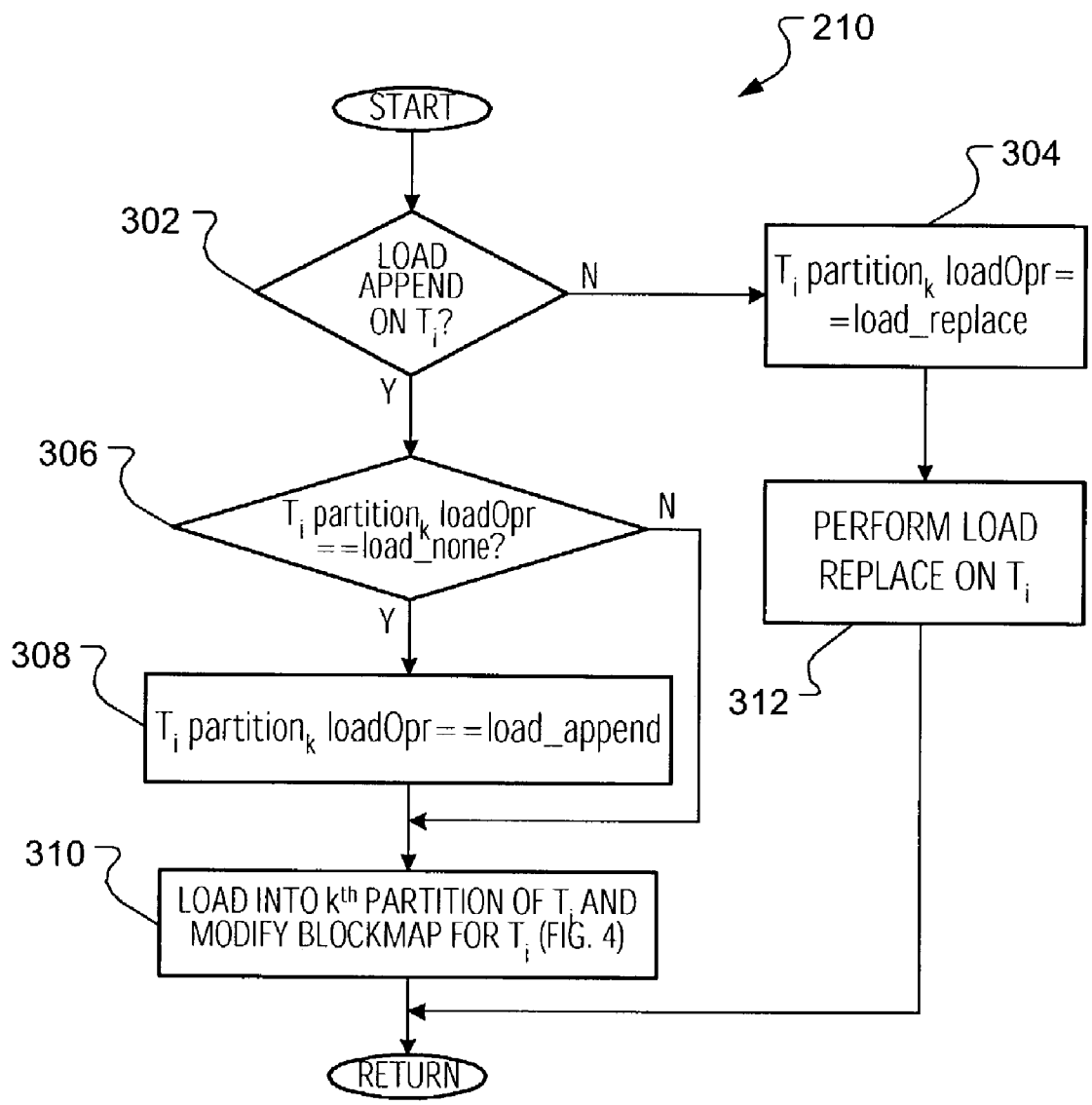
FIG. 3 is a process flow chart illustrating a block identification management method used in the table loading method of FIG. 2, according to an embodiment of the present invention.
Figure 4:
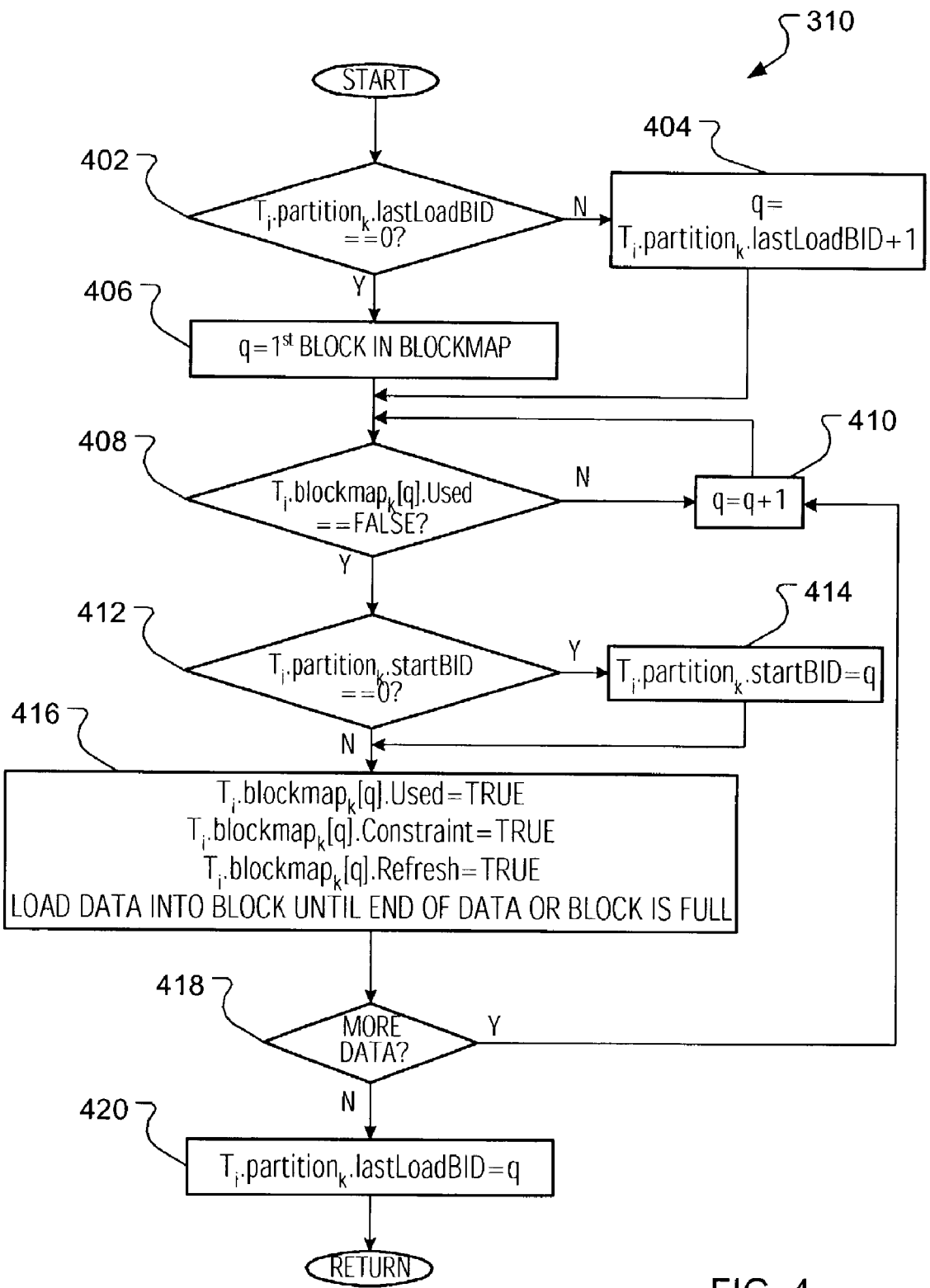
FIG. 4 is a process flow chart illustrating a block map modification method used in the block identification management method of FIG. 3, according to an embodiment of the present invention.

FIG. 3 illustrates, in conjunction with FIG. 4, step 210 of a BID management method for use when loading into a particular partition, the kth partition, of Ti. Note that the method described for loading the kth partition is equally valid for the first and last (pth) partitions. Upon completion of step 210, the value of Ti.partitionk.loadOpr is set to the most computationally expensive load operation that occurred on the kth partition of the MDC base table since the last time the constraints were checked on the MDC base table. The BID management method of FIG. 3 thus relies on a predetermined relationship between load operations. In particular, a "load replace" operation is considered more expensive than "load append" operation which, in turn, is considered more expensive than a "load none" operation.

It is initially determined whether a load append operation is to be performed on the MDC base table of interest (step 302). If a load append operation is not to be performed on the MDC base table of interest, the value of Ti.partitionk.loadOpr is set to load_replace (step 304) and a load replace operation is performed in a traditional manner (step 312). As the present application is concerned with the load append operation, details of the load replace operation are not presented. Subsequent to the load replace operation, program control may return to the MDC base table loading method of FIG. 2.

If a load append operation has been performed on the MDC base table of interest, it is determined whether the value of Ti.partitionk.loadOpr is load_none (step 306) meaning that the partition has not been loaded in this check pending period. If the value of Ti.partitionk.loadOpr is load_none, the value of Ti.partitionk.loadOpr is set to load_append (step 308). The load operation is performed and the blockmap of the MDC base table is modified (step 310) to reflect the load operation.

The load operation and blockmap modification step (step 310) is expanded upon in FIG. 4. Once the load operation and blockmap modification step is complete, program control may be returned to the MDC base table loading method of FIG. 2. If the value of Ti.partitionk.loadOpr is not load_none, the step wherein the value of Ti.partitionk.loadOpr is set to load_append (step 308) is bypassed and the load operation and blockmap modification step (step 310) is performed.

The data loading and blockmap modification method 310 is illustrated in FIG. 4. For each partition k, the blockmap is scanned to find the first free block whose BID is greater than Ti.partitionk.lastLoadBID. Data is then loaded into that first free block and those free blocks after that first free block. The blockmap modification method 310 begins with a determination of whether Ti.partitionk.lastLoadBID is equal to zero (step 402). If Ti.partitionk.lastLoadBID is not equal to zero, a counter, q, is set to Ti.partitionk.lastLoadBID+1 (step 404). If Ti.partitionk.lastLoadBID is equal to zero, q is set to the BID of the first block in the blockmap (step 406). The first free block found is then identified as follows. It is determined whether the value of Ti.blockmapk[q].Used is FALSE (step 408). If the value of Ti.blockmapk[q].Used is TRUE, q is incremented by one (step 410) and step 408 is repeated. If the value of Ti.blockmapk[q].Used is FALSE, the associated block is considered to be the first free block. Ti.partitionk.startBID is then set to the BID of the first free block found in the current check pending period.

Before setting the value of Ti.partitionk.startBID, it is first determined whether Ti.partitionk.startBID is equal to zero (step 412). If Ti.partitionk.startBID is equal to zero (i.e., the present load is the first load since the MDC base table was in "normal" state), then Ti.partitionk.startBID is set to the value of q (step 414). If Ti.partitionk.startBID is not equal to zero, then at least one load has been performed since the MDC base table was in "normal" state and, associated with the first of the at least one load, Ti.partitionk.startBID has been set already.

Subsequently, and without regard for whether Ti.partitionk.startBID is equal to zero, data is loaded into the block with a BID equal to q (step 416). For each loaded block, the corresponding blockmap entry will be marked so that Ti.blockmapk[q].Used=TRUE, Ti.blockmapk[q].Constraint=TRUE and Ti.blockmapk[q].Refresh=TRUE. The loading continues until the end of the data is reached or the block is full. When the loading is complete, it is determined whether there is more data to load (step 418). If there is more data to load, q is incremented by one (step 410) so that the block with the next BID in sequence may be considered for loading. If there is no more data to load, Ti.partitionk.lastLoadBID is set to the current value of q (step 420), i.e., Ti.partitionk.lastLoadBID is updated to reflect the value of the highest BID used to store newly loaded data. The blockmap modification method 310 is then complete so that program control may return to the BID management method of FIG. 3.

Figure 5:
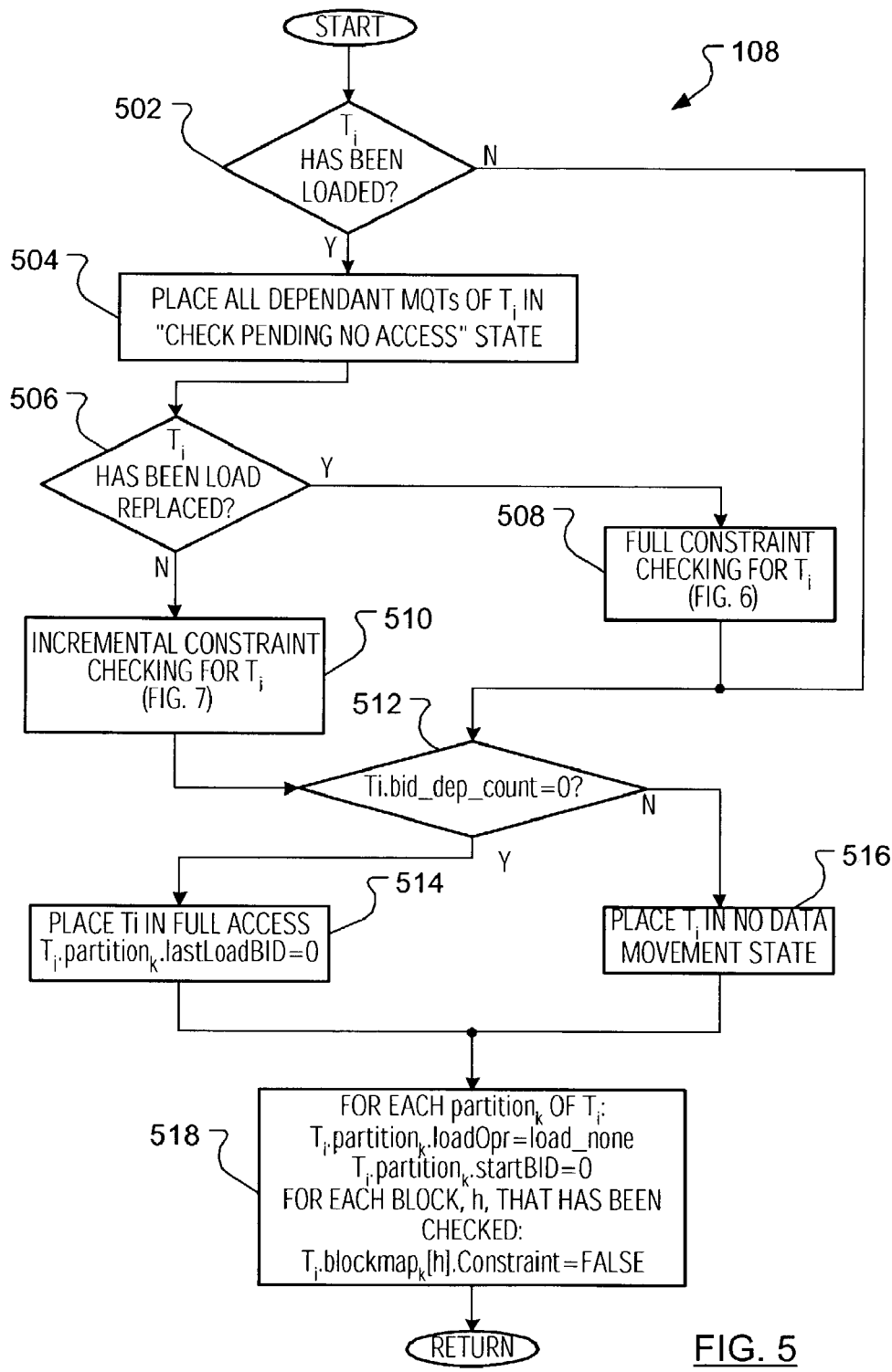
FIG. 5 is a process flow chart illustrating a constraint checking method used in the Load, Constraint Checking, and Materialized Query Table maintenance method of FIG. 1, according to an embodiment of the present invention.

The step of performing constraint checking on MDC base table Ti (step 108 of FIG. 1) is presented in greater detail in FIG. 5. It is first determined whether Ti has been loaded (step 502). If Ti has been loaded, the MQTs that are dependant on Ti are placed in "check pending no access" state (step 504), as the MQTs are, due to the load, out of sync with Ti. It is then determined whether the load operation performed on Ti was a load replace operation (step 506). If Ti has had a load replace operation performed, then a full constraint check is performed on MDC base table TI (step 508). The full constraint check of step 508 is expanded upon in FIG. 6. If the load operation performed on Ti was not a load replace operation, then it is assumed that the load operation was a load append operation. If a load append operation has been performed on Ti, an incremental constraint check may be performed on MDC base table Ti (step 510). The incremental constraint check of step 510 is expanded upon in FIG. 7.

Once constraints are checked on Ti, or if it is determined, in step 502, that Ti has not been loaded, the Ti.BID_dep_count is examined (step 512) to determine the number of MQTs that need to be refreshed. Where Ti.BID_dep_count is zero, MDC base table Ti may be placed in normal "normal full access" state (step 514), and Ti.partitionk.lastLoadBID is reset to zero so that the next load operation on the table can start finding an empty block from the start of the blockmap. Where Ti.BID_dep_count is greater than zero, Ti may be placed in "normal no data movement" state (step 516). In either case, Ti.partitionk.loadOpr and Ti.partitionk.startBID are reset (step 518) to prepare for the next load into Ti. Additionally, Ti.blockmapk[h].Constraint is set to FALSE for all checked blocks. The constraint check is then complete and the program control may be returned to the materialized query table maintenance method of FIG. 1.

Figure 6:
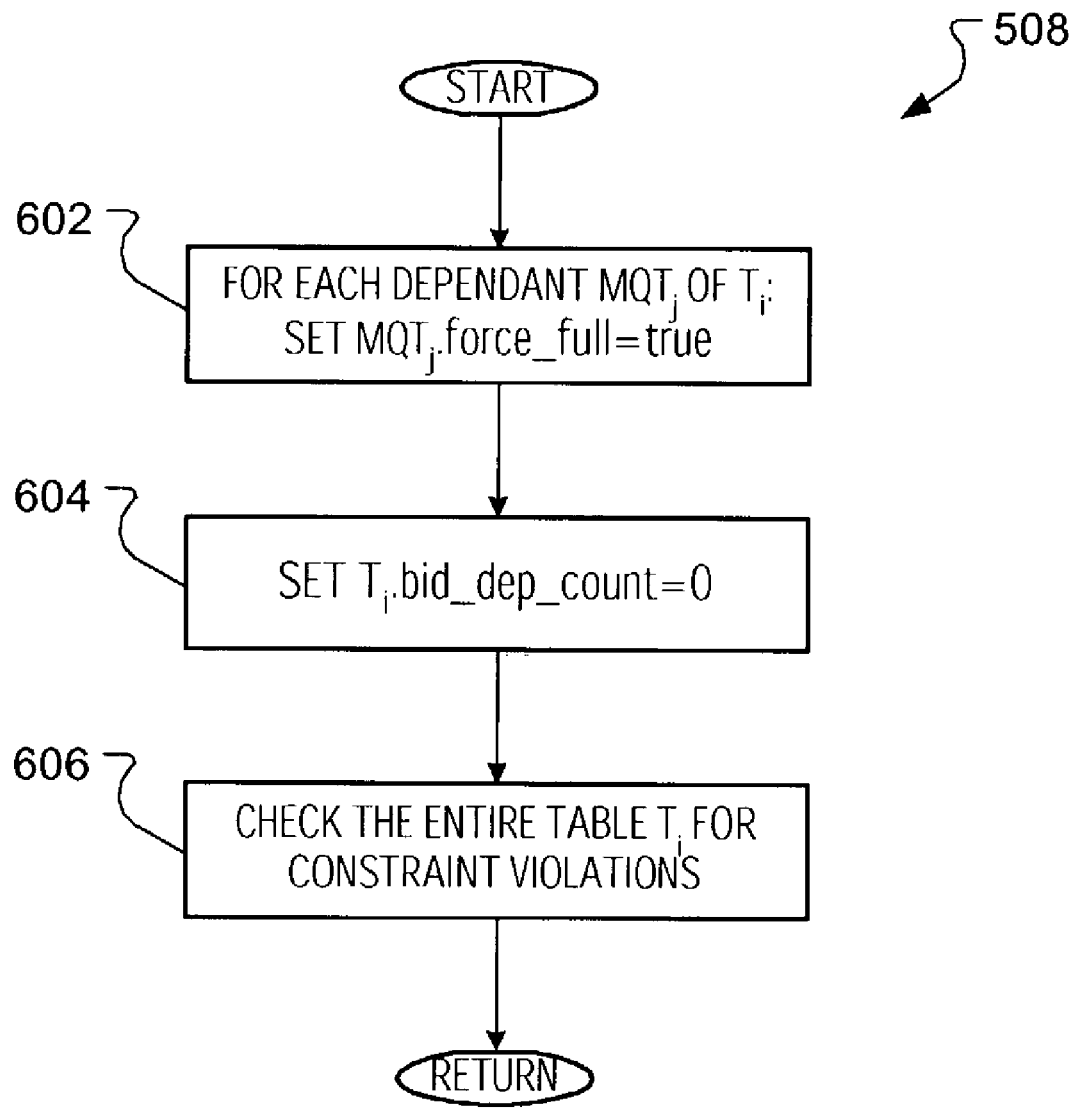
FIG. 6 is a process flow chart illustrating a full constraint checking method used in the constraint checking method of FIG. 5, according to an embodiment of the present invention.

FIG. 6 illustrates the full constraint checking step of FIG. 5 (step 508). Once a full constraint check has been performed on Ti, all of the MQTs dependant on Ti should be forced to be fully refreshed. To enforce this refresh, MQTj.force_full is set to TRUE for each dependant MQTj of Ti (step 602). Ti.BID_dep_count is reset to zero (step 604). Ti.BID_dep_count reflects the number of MQTs that remain to be incrementally refreshed and previous steps have established that the MQTs are to be forced to have a full refresh rather than an incremental refresh. Consequently, Ti.BID_dep_count is reset to zero (step 604) because there are no MQTs that are to be incrementally refreshed. Finally, the entire MDC base table is checked for constraint violations and program control is returned to the constraint checking method of FIG. 5.

Figure 7:
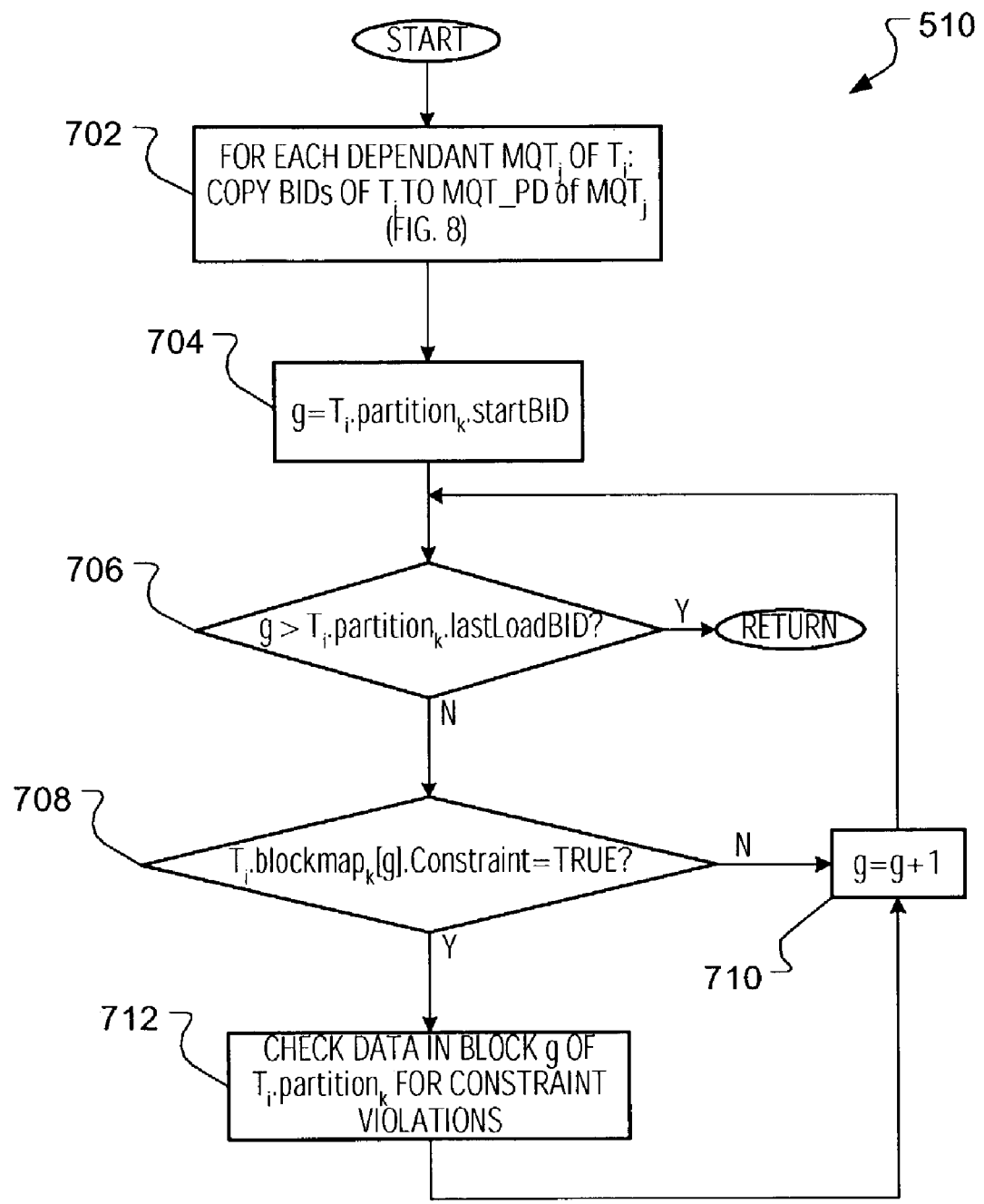
FIG. 7 is a process flow chart illustrating an incremental constraint checking method used in the constraint checking method of FIG. 5, according to an embodiment of the present invention.

FIG. 7 illustrates the incremental constraint checking step of FIG. 5 (step 510). In this step, only the blocks between the Ti.partitionk.startBID and the Ti.partitionk.lastLoadBID of each partition are scanned and, if flagged as requiring a constraint check, checked for constraints. Initially, the starting BID information (Ti.partitionk.startBID) of Ti is copied to all of the MQTs that depend on Ti (step 702), so that the dependant MQTs can later be refreshed with respect to the load appended data in Ti. Step 702 is expanded upon in FIG.

8. For each partition, k, of Ti, Ti.blockmapk is scanned starting with the block having a BID equal to the value held by Ti.partitionk.startBID.

To this end, a counter, g, is set to Ti.partitionk.startBID (step 704). That is, the search for blocks on which to perform constraint checking begins at the block where the earliest load of the current check pending period began. The search continues only until the end of the blocks affected by the load(s). To this end, it is determined whether g is greater than Ti.partitionk.lastLoadBID (step 706). If g has surpassed Ti.partitionk.lastLoadBID, the incremental constraint checking is complete and program control is returned to the constraint checking method of FIG. 5.

For a g less than or equal to Ti.partitionk.lastLoadBID, it is determined whether Ti.blockmapk[g].Constraint is equal to TRUE (step 708). If Ti.blockmapk[g].Constraint is not equal to TRUE, g is incremented by one (step 710) and the comparison of g with Ti.partitionk.lastLoadBID (step 706) is repeated for the new value of g. If Ti.blockmapk[g].Constraint is equal to TRUE, the data in the block with a BID equal to g is checked for constraint violations (step 712). Each row in the block is checked for constraint violations, which are handled the normal way, e.g., an error is returned upon the first constraint violation found, or the constraint violating rows are moved to an exception table. Once the constraint checking of the block is complete, g is incremented by one (step 710) and the comparison of g with Ti.partitionk.lastLoadBID (step 706) is repeated for the new value of g.

Figure 8:
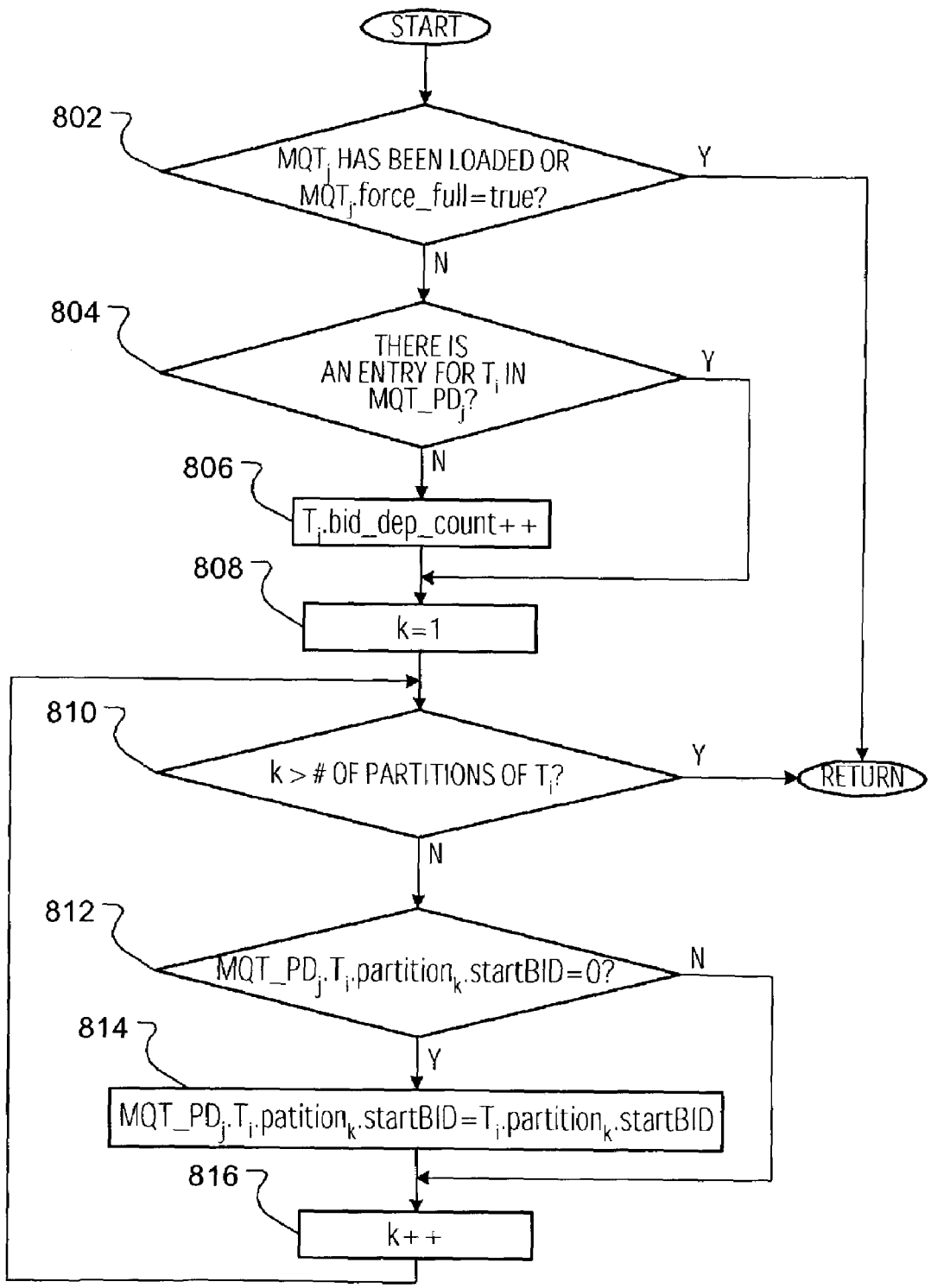
FIG. 8 is a process flow chart illustrating a block identification copying method used in the incremental constraint checking method of FIG. 7, according to an embodiment of the present invention.

FIG. 8 illustrates, in greater detail, step 702 of FIG. 7 for copying BID information from Ti to the MQT_PD of each of the j MQTs that are dependant on Ti. Initially, it is determined whether a particular MQT, MQTj, has been loaded or forced to be fully refreshed (step 802). If MQTj has been loaded or forced to be fully refreshed, then MQTj can not be incrementally refreshed and there is no need to copy the starting BIDs info to such an MQT. In such a case, program control is returned to the incremental constraint checking method of FIG. 7. Otherwise, it is determined whether there is an entry for Ti in the packed descriptor for MQTj, MQT_PDj (step 804). The existence of such an entry indicates that MQTj already depends on a prior load append operation performed on Ti. If such an entry does not exist, then Ti.BID_dep_count is incremented (step 806), since MQTj now depends on Ti. If such an entry does exist, then step 806 is bypassed. Copying then progresses on a partition-by-partition basis.

The partition number, k, is initialized to 1 (step 808). As the partition number is incremented, the partition number is compared to the total number of partitions (step 810). If the partition number exceeds the total number of partitions, the BID information copying method is complete and program control is returned to the incremental constraint checking method of FIG. 7.

As long as the partition number does not exceed the number of partitions, it is determined whether the StartBID of the present partition, MQT_PDj.Ti.partitionk.startBID, has a value other than zero (step 812). Note that non-zero starting BIDs are not overwritten. This avoidance of overwriting allows multiple load append operations and constraint checking operations on the MDC base tables before the materialized query tables are incrementally refreshed. If MQT_PDj.Ti.partitionk.startBID is zero, the value of Ti.partitionk.startBID is copied to MQT_PDj.Ti.partitionk.startBID (step 814) and the partition number is incremented (step 816). Otherwise, the copying step (step 814) is bypassed and the partition number is incremented (step 816).

Figure 9:
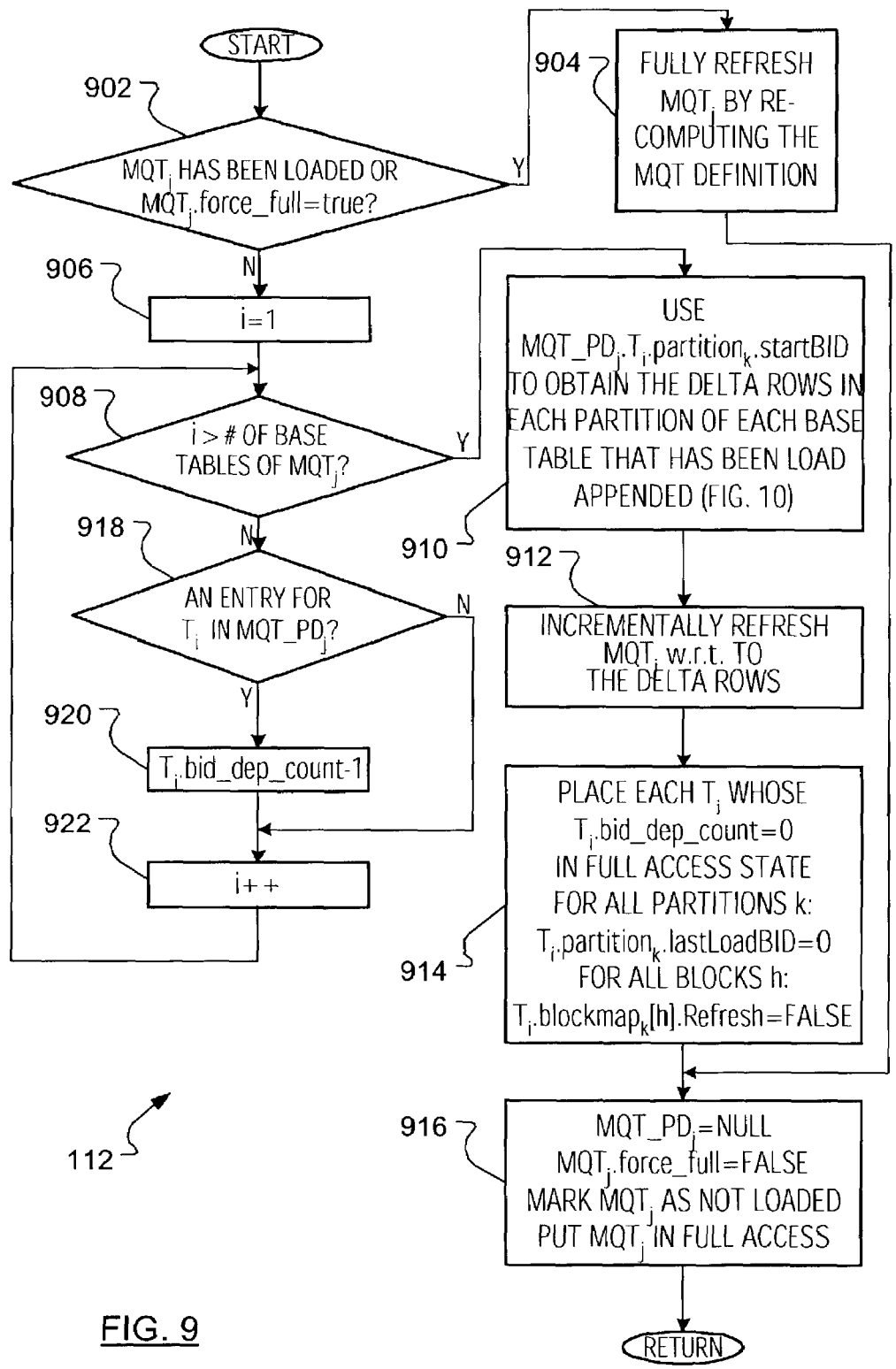
FIG. 9 is a process flow chart illustrating a Materialized Query Table refreshing method used in the Load, Constraint Checking, and Materialized Query Table maintenance method of FIG. 1, according to an embodiment of the present invention.

FIG. 9 expands upon step 112 of FIG. 1 to illustrate a refresh of a dependent MQT of Ti. Initially, it is determined whether a particular MQT, MQTj, is loaded or is forced to be fully refreshed (step 902). If MQTj is loaded or forced to be fully refreshed, then a full refresh of MQTj is performed by re-computing the query definition of MQTj (step 904). MQTj is then reset (step 916) as described hereinafter. If MQTj can be incrementally refreshed, i.e., it is determined in step 902 that MQTj is not loaded or forced to be fully refreshed, a base table counter, i, is initialized to 1 (step 906). As the base table counter will be incremented, the value of the base table counter is compared to the total number of MDC base tables upon which MQTj is dependent (step 908).

If it is determined that the base table counter does not exceed the number of MDC base tables of MQTj, it is then determined whether an entry for Ti exists in MQT_PDj (step 918). If it is determined that an entry for Ti exists in MQT_PDj, Ti.BID_dep_count is reduced by one (step 920), because MQTj is no longer dependent on these MDC base tables once MQTj has been refreshed. The base table counter is then incremented (step 922). Where it is determined in step 918 that an entry for Ti does not exist in MQT_PDj, the Ti.BID_dep_count reduction step (step 920) is bypassed.

Once the base table counter exceeds the number of MDC base tables in MQTj, as determined in step 908 (i.e., the BID_dep_counts of all base tables on which MQTj is BID-dependent have been decremented), delta rows (i.e., rows that have changed) are identified for each partition of each MDC base table through use of MQT_PDj.Ti.partitionk.startBID (step 910). Step 910 is expanded upon in FIG. 10. As will be apparent to a person skilled in the art, the delta rows will comprise every row in the blocks that have been loaded. MQTj is then incrementally refreshed with respect to the delta rows obtained in step 910 (step 912). Following the refresh, the MDC base tables are reset (step 914).

In particular, the state of those MDC base tables whose Ti.BID_dep_count has been reduced to zero, is changed from "normal no data movement" state to "normal full access" state, Ti.partitionk.lastLoadBID in all partitions is reset to zero and Ti.blockmapk[h].Refresh is reset to FALSE for all blocks. Subsequently, MQTj is reset (step 916). In particular, resetting MQTj involves placing MQTj in "normal full access" state and resetting the MQT_PDj flag, the MQTj.force_full flag and the load flag to prepare for the next refresh. The refresh of MQTj is then complete and the program control may be returned to the materialized query table maintenance method of FIG. 1.

Figure 10:
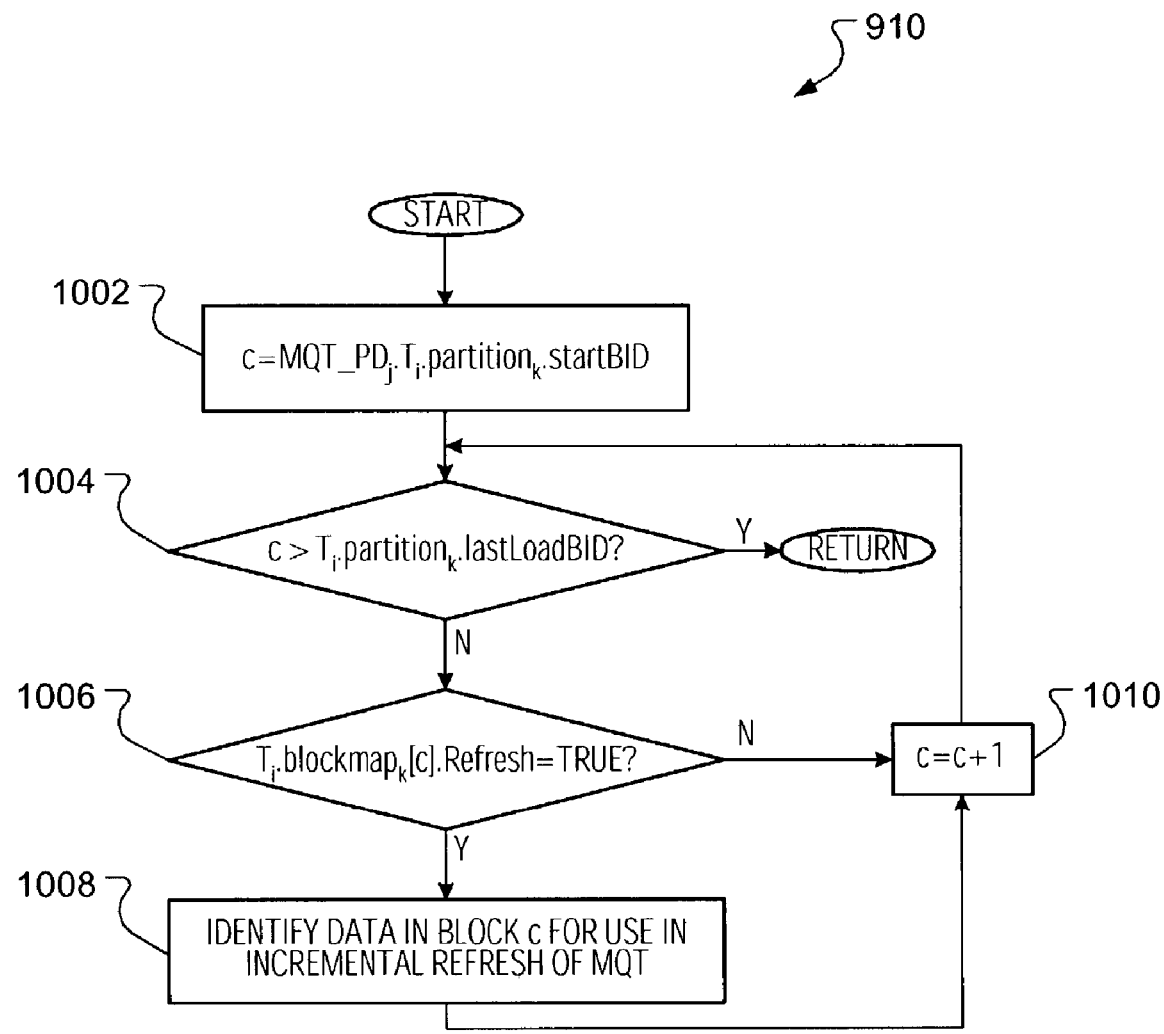
FIG. 10 is a process flow chart illustrating a method for obtaining delta rows used in the Materialized Query Table refreshing method of FIG. 9.

FIG. 10 illustrates the use of MQT_PDj.Ti.partitionk.startBID to obtain delta rows for each partition of each MDC base table. Initially, an identifier, c, of a block under consideration is set to the value of MQT_PDj.Ti.partitionk.startBID (step 1002). It is then determined whether c exceeds Ti.partitionk.lastLoadBID (step 1004). If c exceeds Ti.partitionk.lastLoadBID, program control is returned to the MQT refreshing method of FIG. 9.

If c does not exceed Ti.partitionk.lastLoadBID, it is determined whether Ti.blockmapk[c].Refresh has a value of TRUE (step 1006). If Ti.blockmapk[c].Refresh has a value of TRUE, the data block c may be identified (step 1008) for use in the incremental refresh of MQTj in step 912 of FIG. 9. For each block c with Ti.blockmapk[c].Refresh=TRUE, all rows in the block will be used for the incremental refresh of MQTj. The value of c is then incremented (step 1010). If Ti.blockmapk[c].Refresh has a value of FALSE, c is incremented (step 1010), bypassing the identification step (step 1008). Subsequent to incrementing c, it is determined whether c exceeds Ti.partitionk.lastLoadBID (step 1004).

An example follows for which the description of several initial conditions are required. For instance, it is assumed that an underlying MDC base table T has two dependent materialized query tables, MQT1 and MQT2. MDC base table T has two partitions and thus one blockmap for each partition. There are five blocks in each blockmap. A blockmap has the following notation: 1[F]2[U]3[F]4[F]5[UCR], where F=Free, U=Used, C=Constraints To Be Checked, R=To Be Used For Refresh Of Dependent MQTs. Each block can have a state of either F or U. A "U" followed by C and/or R means that the constraint and/or refresh flags are also set. The notation 1[F]2[U]3[F]4[F]5[UCR] indicates that blocks 1, 3 and 4 are Free, block 2 is Used and block 5 is Used, has Constraints to be checked and is to be used for Refresh processing.

Zero is used as the initial BID value (stored at Page 0 of the underlying MDC base table or MQT_PD) to indicate that no block needs to be checked.

| Notation | Meaning | Possible Values |
|---|---|---|
| T.state | State of MDC base table T. | Check Pending Read Access<br>Check Pending No Access<br>No Data Movement<br>Full Access |
| $MQT_j$.state | State of $MQT_j$. | Full Access<br>Check Pending |
| $T.partition_k$.startBID | The StartBID stored in page 0 of partition k of MDC base table T | |
| $T.partition_k$.lastLoadBID | The highest BID value used in previous load append operation for partition k of MDC base table T. | |
| $MQT_j.T.partition_k$.startBID | StartBID of blockmap of partition k of MDC base table T stored in PD of $MQT_j$. | |
| $T.blockmap_k$ | Blockmap of partition k of MDC base table T. | |

0. Initial Conditions
   T.state=Full Access
   $T.partition_1$.startBID=0
   $T.partition_2$.startBID=0
   $T.partition_1$.lastLoadBID=0
   $T.partition_2$.lastLoadBID=0
   $T.blockmap_1$=1[U]2[F]3[U]4[F]5[F]
   $T.blockmap_2$=1[F]2[U]3[F]4[U]5[F]
   $MQT_1$.state=Full Access
   $MQT_2$.state=Full Access
   $MQT_1.T.partition_1$.startBID=0
   $MQT_1.T.partition_2$.startBID=0
   $MQT_2.T.partition_1$.startBID=0
   $MQT_2.T.partition_2$.startBID=0

1. A First Load Append Operation is Performed on T.
   It is assumed that the first load append operation uses block 2 on partition 1 and no blocks on partition 2.
   T.state=Check Pending Read Access
   $T.partition_1$.startBID=2
   $T.partition_2$.startBID=0
   $T.partition_1$.lastLoadBID=2
   $T.partition_2$.lastLoadBID=0
   $T.blockmap_1$=1[U]2[UCR]3[U]4[F]5[F]
   $T.blockmap_2$=1[F]2[U]3[F]4[U]5[F]
   $MQT_1$.state=Full Access
   $MQT_2$.state=Full Access
   $MQT_1.T.partition_1$.startBID=0
   $MQT_1.T.partition_2$.startBID=0
   $MQT_2.T.partition_1$.startBID=0
   $MQT_2.T.partition_2$.startBID=0
   Comments:
   T.state has changed from Full Access to Check Pending Read Access due to the load append operation.
   $T.partition_1$.startBID has changed from 0 to 2.
   $T.partition_1$.lastLoadBID has changed from 0 to 2.
   State of block 2 of blockmap 1 has been updated to "Used", "Constraint", "Refresh"

2. A Second Load Append Operation is Performed on T.
   It is assumed that the second load append operation uses block 4 on partition 1, block 1 on partition 2 and block 3 on partition 2.
   T.state=Check Pending Read Access
   $T.partition_1$.startBID=2
   $T.partition_2$.startBID=1
   $T.partition_1$.lastLoadBID=4
   $T.partition_2$.lastLoadBID=3
   $T.blockmap_1$=1[U]2[UCR]3[U]4[UCR]5[F]
   $T.blockmap_2$=1[UCR]2[U]3[UCR]4[U]5[F]
   $MQT_1$.state=Full Access
   $MQT_2$.state=Full Access
   $MQT_1.T.partition_1$.startBID=0
   $MQT_1.T.partition_2$.startBID=0
   $MQT_2.T.partition_1$.startBID=0
   $MQT_2.T.partition_2$.startBID=0
   Comments:
   The load operation involves scanning for free blocks, starting, on each partition, from the blockmap entry with a number corresponding to LastLoadBID +1.
   Although additional blocks are "allocated" from partition 1 of T, $T.partition_1$.startBID has not been updated because it was non-zero, i.e., a lowest value BID of a block used since the last check has already been established.
   $T.partition_2$.startBID was changed from 0 to 1.
   $T.partition_1$.lastLoadBID moved to 4 and $T.partition_2$.lastLoadBID is set to 3.
   State of loaded blocks in blockmaps has been changed to "In-Use", "Constraint" and "Refresh".

3. A Constraint Check is Performed on T.
   T.state=No Data Movement
   $T.partition_1$.startBID=0
   $T.partition_2$.startBID=0
   $T.partition_1$.lastLoadBID=4
   $T.partition_2$.lastLoadBID=3
   $T.blockmap_1$=1[U]2[UR]3[U]4[UR]5[F]
   $T.blockmap_2$=1[UR]2[U]3[UR]4[U]5[F]
   $MQT_1$.state=check pending
   $MQT_2$.state=check pending
   $MQT_1.T.partition_1$.startBID=2
   $MQT_1.T.partition_2$.startBID=1
   $MQT_2.T.partition_1$.startBID=2
   $MQT_2.T.partition_2$.startBID=1
   Comments:
   Constraints have been checked for T (in blocks 2 and 4 of partition 1 and in blocks 1 and 3 of partition 2).
   State of T has been changed to No Data Movement.
   Both $MQT_1$ and $MQT_2$ have been placed in "check pending" state.

The StartBIDs of T have been copied to MQTs.
The StartBIDs of T have been reset.
LastLoadBIDs do not change since the MDC base table is not yet in Full Access state. A LastLoadBID cannot be reset until all dependent MQTs have been refreshed. This ensures that refresh operations will pick up all load operations.
"Constraint" flags in blockmaps of T have been removed.

4. A Refresh is Performed on Materialized Query Table $MQT_1$.
T.state=No Data Movement
$T.partition_1.startBID=0$
$T.partition_2.startBID=0$
$T.partition_1.lastLoadBID=4$
$T.partition_2.lastLoadBID=3$
$T.blockmap_1=1[U]2[UR]3[U]4[UR]5[F]$
$T.blockmap_2=1[UR]2[U]3[UR]4[U]5[F]$
$MQT_1.state=Full Access$
$MQT_2.state=check pending$
$MQT_1.T.partition_1.startBID=0$
$MQT_1.T.partition_2.startBID=0$
$MQT_2.T.partition_1.startBID=2$
$MQT_2.T.partition_2.startBID=1$
Comments:
$MQT_1$ is incrementally refreshed. Partition 1 of T from block 2 and partition 2 of T from block 1 are considered as delta (change) in T with respect to the incremental refresh of $MQT_1$.
$MQT_1$ has been changed from check pending state to Full Access state.
StartBIDs stored in $MQT_1$ have been reset.

5. A Third Load Append Operation is Performed on T.
It is assumed that the load operation uses block 5 on partition 1 and block 5 on partition 2.
T.state=Check Pending Read Access
$T.partition_1.startBID=5$
$T.partition_2.startBID=5$
$T.partition_1.lastLoadBID=5$
$T.partition_2.lastLoadBID=5$
$T.blockmap_1=1[U]2[UR]3[U]4[UR]5[UCR]$
$T.blockmap_2=1[UR]2[U]3[UR]4[U]5[UCR]$
$MQT_1.state=Full Access$
$MQT_2.state=Check Pending$
$MQT_1.T.partition_1.startBID=0$
$MQT_1.T.partition_2.startBID=0$
$MQT_2.T.partition_1.startBID=2$
$MQT_2.T.partition_2.startBID=1$
Comments:
The load operation has scanned for free blocks from LastLoadBID+1 entry in the blockmap of each partition.
The $T.partition_k.lastLoadBID$ values have been updated.
The state of loaded blocks in the blockmaps has been changed to "Used", "Constraint", "Refresh".
The $T.partition_k.startBID$ values have been updated because the values were 0, since the load operation is the first load operation after a constraint check has been performed on T.

6. A Constraint Check Performed on T.
T.state No Data Movement
$T.partition_1.startBID=0$
$T.partition_2.startBID=0$
$T.partition_1.lastLoadBID=5$
$T.partition_2.lastLoadBID=5$
$T.blockmap_1=1[U]2[UR]3[U]4[UR]5[UR]$
$T.blockmap_2=1[UR]2[U]3[UR]4[U]5[UR]$
$MQT_1.state=check pending$
$MQT_2.state=check pending$
$MQT_1.T.partition_1.startBID=5$
$MQT_1.T.partition_2.startBID=5$
$MQT_2.T.partition_1.startBID=2$
$MQT_2.T.partition_2.startBID=1$
Comments:
Constraints checked for T (in block 5 of partition 1 and in block 5 of partition 2).
The state of T has been changed to No Data Movement.
$MQT_1$ is placed in "check pending" state.
$T.partition_k.startBID$ values have been copied to $MQT_1$.
$T.partition_k.startBID$ values have not been copied to $MQT_2$ because it has non-zero values.
$T.partition_k.startBID$ values in page 0 of T have been reset.
"Constraint" flags in blockmaps of T have been removed.

7. A Refresh is Performed on Materialized Query Table MQT.
T.state=No Data Movement
$T.partition_1.startBID=0$
$T.partition_2.startBID=0$
$T.partition_1.lastLoadBID=5$
$T.partition_2.lastLoadBID=5$
$T.blockmap_1=1[U]2[UR]3[U]4[UR]5[UR]$
$T.blockmap_2=1[UR]2[U]3[UR]4[U]5[UR]$
$MQT_1.state=Full Access$
$MQT_2.state=check pending$
$MQT_1.T.partition_1.startBID=0$
$MQT_1.T.partition_2.startBID=0$
$MQT_2.T.partition_1.startBID=2$
$MQT_2.T.partition_2.startBID=1$
Comments:
$MQT_1$ has been incrementally refreshed. Partition 1 block 5 and partition 2 block 5 of T are the delta rows (changed rows) with respect to incremental refresh of $MQT_1$.
The state of $MQT_1$ has been changed from check pending state to Full Access state.
The $MQT_1.T.partition_k.startBID$ values have been reset.

8. A Refresh is Performed on Materialized Query Table $MQT_2$.
T.state=Full Access
$T.partition_1.startBID=0$
$T.partition_2.startBID=0$
$T.partition_1.lastLoadBID=0$
$T.partition_2.lastLoadBID=0$
$T.blockmap_1=1[U]2[U]3[U]4[U]5[U]$
$T.blockmap_2=1[U]2[U]3[U]4[U]5[U]$
$MQT_1.state=Full Access$
$MQT_2.state=Full Access$
$MQT_1.T.partition_1.startBID=0$
$MQT_1.T.partition_2.startBID=0$
$MQT_2.T.partition_1.startBID=0$
$MQT_2.T.partition_2.startBID=0$
Comments:
$MQT_2$ has been incrementally refreshed. Blocks 2, 4 and 5 of partition 1 and blocks 1, 3 and 5 of partition 2 are the delta rows (changes) with respect to the incremental for $MQT_2$.

The state of MQT$_2$ has been changed from check pending state to Full Access state.

BIDs stored in MQT$_2$ have been reset.

The state of T has been changed from No Data Movement to Full Access because T.BID_dep_count indicates that there are no more dependent immediate MQTs that need to be refreshed to what has been loaded into T.

The Refresh flags in the blockmaps of T have been reset.

T.partitionk.lastLoadBID values have been reset to zero.

Notes:

The LastLoadBID field ensures that subsequent load append operations use later parts of the MDC base table (Object Relative). This allows inserts and deletes to free up blocks anywhere in the MDC base table while guaranteeing no adverse effects such as re-refreshing an MQT using previously loaded data.

It is to be understood that the specific embodiments of the invention that have been described are merely illustrative of certain application of the principle of the present invention. Numerous modifications may be made to the system and method for identifying and maintaining base table blocks requiring deferred incremental integrity maintenance invention described herein without departing from the spirit and scope of the present invention.

What is claimed is:

1. A processor-implemented method of maintaining a plurality of data blocks that require an incremental maintenance operation to process new data in a database, the database having a base table with a plurality of contiguous data blocks, the method comprising:

setting a block map associated with the base table by recording a status of each data block in the base table;

searching the block map to identify the status of a marked data block that stores the new data, in order to determine if the incremental maintenance operation is required on the identified marked data block;

wherein the status of each data block includes information on whether a change to the identified marked data block requires a constraint checking operation to be performed on the identified marked data block, wherein the constraint includes a condition that is defined for the base table and that must be true for all rows of the base table;

upon determination that the change to the identified marked data block requires the constraint checking operation to be performed, performing the incremental maintenance operation on the identified marked data block, to exclusively process the new data in the identified marked data block; and storing the processed new data in the database.

2. The method of claim 1, further comprising performing a refresh operation on a materialized query table that is dependent on the base table; and further comprising performing a load operation to load the materialized query table into a plurality of partitions.

3. The method of claim 2, further comprising placing the materialized query table in a check pending a read access state if the load operation is a load append operation.

4. The method of claim 2, further comprising placing the materialized query table in a check pending a no access state if the load operation is other than a load append operation.

5. The method of claim 2, further comprising flagging a load operation that is computationally expensive, which occurred on a partition of a multi-dimensionally clustered table.

6. The method of claim 5, wherein the multi-dimensionally clustered table includes a plurality of equally sized contiguous blocks.

7. The method of claim 5, further comprising determining whether the load append operation is to be performed on the multi-dimensionally clustered table.

8. The method of claim 7, wherein if the partition of the multi-dimensionally clustered table is not to be loaded, performing a load replace operation.

9. The method of claim 7, further comprising setting a load append flag if the partition of the multi-dimensionally clustered table is to be loaded but has not yet been loaded.

10. The method of claim 7, further comprising modifying the block map to reflect a load operation of the partition of the multi-dimensionally clustered table.

11. The method of claim 10, further comprising finding a first free block in the block map.

12. The method of claim 11, further comprising loading data in the first free block until the first free block is full.

13. The method of claim 12, further comprising setting a status flag in the block map, indicating that the first free block is used.

14. The method of claim 12, further comprising setting a constraint flag in the block map, indicating that the first free block is to be checked for constraint violations.

15. The method of claim 12, further comprising setting a refresh flag in the block map, indicating that the first free block is to be used for refresh processing of a dependent materialized query tables.

16. The method of claim 5, further comprising checking for constraint violations in the multi-dimensionally clustered table.

17. The method of claim 16, further comprising performing incremental constraint checking of the base table if the base table has not been load replaced.

18. The method of claim 17, further comprising placing the base table in a full access state if the number of materialized query tables needing to be refreshed is zero.

19. The method of claim 18, further comprising placing the base table in a no data movement state if the number of materialized query tables needing to be refreshed is greater than zero.

20. The method of claim 19, further comprising re-computing a query definition for the materialized query table if the materialized query table has been fully loaded and a force refresh status flag requires a full refresh.

21. A computer program product having instruction codes stored on a computer-usable medium, for maintaining a plurality of data blocks that require an incremental maintenance operation to process new data in a database, the database having a base table with a plurality of contiguous data blocks, the computer program product comprising:

a set of instruction codes for setting a block map associated with the base table by recording a status of each data block in the base table;

a set of instruction codes for searching the block map to identify the status of a marked data block that stores the new data, in order to determine if the incremental maintenance operation is required on the identified marked data block;

wherein the status of each data block includes information on whether a change to the identified marked data block requires a constraint checking operation to be performed on the identified marked data block, wherein the constraint includes a condition that is defined for the base table and that must be true for all rows of the base table; and a set of instruction codes for performing the required incremental maintenance operation on the identified marked data block, upon determination that the change to the identified marked data block requires the constraint checking operation to be performed, to exclusively process the new data in the identified marked data block; and a set of instruction codes for storing the processed new data in the database.

22. A processor-implemented system for maintaining a plurality of data blocks that require an incremental maintenance operation to process new data in a database, the database having a base table with a plurality of contiguous data blocks, the system comprising:

means for setting a block map associated with the base table by recording a status of each data block in the base table;

means for searching the block map to identify the status of a marked data block that stores the new data, in order to determine if the incremental maintenance operation is required on the identified marked data block;

wherein the status of each data block includes information on whether a change to the identified marked data block requires a constraint checking operation to be performed on the identified marked data block, wherein the constraint includes a condition that is defined for the base table and that must be true for all rows of the base table; and means for performing the required incremental maintenance operation on the identified marked data block, upon determination that the change to the identified marked data block requires the constraint checking operation to be performed, to exclusively process the new data in the identified marked data block; and means for storing the processed new data in the database.

* * * * *